(No Model.)
J. P. OUTCALT & L. KISSNER.
Feed Regulator for Grain Drills.
No. 233,009. Patented Oct. 5, 1880.
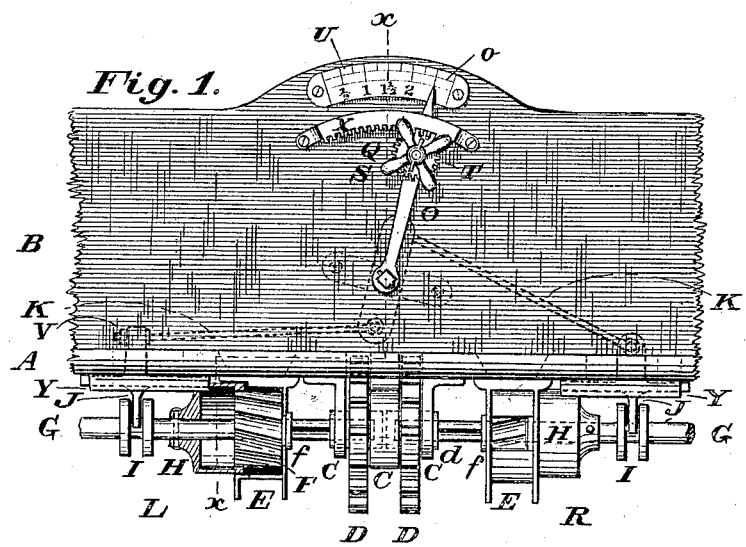
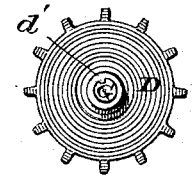
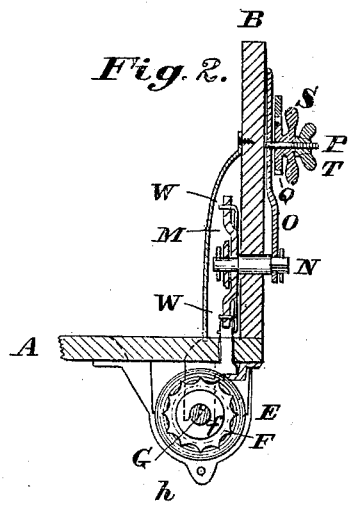
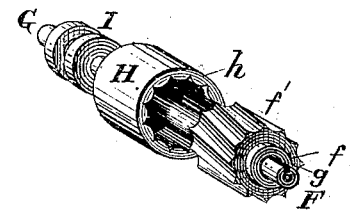
Attest
P. Knight
W. Allen
Jesse P. Outcalt
Leonard Kissner
By Knight Bros.
Attys.

UNITED STATES PATENT OFFICE.

JESSE P. OUTCALT AND LEONARD KISSNER, OF LANCASTER, OHIO, ASSIGNORS TO THE HOCKING VALLEY MANUFACTURING COMPANY, OF SAME PLACE.

FEED-REGULATOR FOR GRAIN-DRILLS.

SPECIFICATION forming part of Letters Patent No. 233,009, dated October 5, 1880.

Application filed July 6, 1880. (No model.)

*To all whom it may concern:*

Be it known that we, JESSE P. OUTCALT and LEONARD KISSNER, both of Lancaster, in the county of Fairfield and State of Ohio, have jointly invented a new and useful Feed-Regulator for Grain-Drills, of which the following is a specification.

Our invention comprises an improved construction of feed-adjusting finger and indicator and accessories. We employ for this purpose a pinion, which, being journaled upon a stud-projection from the finger, works in a rack attached to the outside of the grain box or hopper. A knob or hand-wheel, which is either of one integral piece with the pinion or is permanently fastened to it, enables it to be rotated with ease and precision. The geared connection of the pinion with the rack causes any rotation of the hand-wheel to or fro to be accompanied by a forward or backward vibration of the finger and by a corresponding opening or closure of the cut-offs. The stud upon which the pinion is journaled extends through the hand-wheel, and is screw-threaded at its extremity for a thumb-nut, by which the regulator is promptly and securely retained to any adjustment. The shaft of the regulator-finger, extending through the hopper-wall, terminates in a double crank that communicates by separate rods with as many yokes, that, engaging in grooved collars on the two shafts of the right and left series of grain-deliveries, operate to close or open, to any desired extent, the two series of tubular gates or cut-offs that control the delivery of grain.

In the accompanying drawings, Figure 1 is a rear elevation, showing a portion of the hopper and one of each series of grain-deliverers, (one cup and its sliding tubular gate being shown in section,) and also showing the grain-regulating and indicating finger. Fig. 2 is a vertical section on the line $x\ x$. Fig. 3 is a perspective view, showing one of the feed-wheels with its tubular gate and a portion of the corresponding shaft. Fig. 4 represents one of the chain-wheels in profile.

A may represent a portion of the floor, and B a portion of the rear wall of a grain-drill hopper at the mid-width of the machine.

The grain-delivering mechanism is disposed of in two series, to wit, a right-hand series, R, and a left-hand series, L, of which each series comprises a number of separate but simultaneously-operating deliveries, one delivery of each series being here shown.

Attached to and depending from the hopper-bottom are hangers C, in which are journaled the hubs $d$ of a pair of customary sprockets, D, which have chain-connection (not shown) with the ground-wheel shaft. Also, attached to and depending from the hopper-bottom are customary grain cups or funnels E, in which are journaled the hubs $f$ of the feed or grain delivery wheels F. The hubs $f$ are grooved circumferentially, as indicated in Fig. 1, so as (while permitting their rotation in the cups) to retain them in their proper position in the same.

The sprockets D and the feed-wheels F are bored axially to receive the shafts G. These shafts, of which there are two—namely, one for each series of grain-deliveries—are capable of being slid longitudinally within said sprockets and feed-wheels.

Each shaft is compelled to rotate with its sprocket by means of a tongue, $d'$, on the sprocket that occupies a groove, $g$, in the shaft, and this rotary movement is transmitted from each shaft to its series of feed-wheels through the medium of the provision at each feed-wheel of a tubular cut-off, H, whose scalloped flange $h$ fits and encircles the fluted periphery $f'$ of the corresponding feed-wheel, and is capable of sliding longitudinally of said flutings. These flutings are preferably disposed spirally on said periphery, as represented in Figs. 1 and 3. Hence the adjustment of the cut-off is spiral with respect to the feed-wheel, instead of being longitudinal, as is the case with longitudinally-fluted feed-wheels. Each cut-off, being permanently attached to the feed-delivery shaft, as shown, of course shares all its motions, whether sliding or rotary. The sliding motion of the cut-off operates to cover or uncover portions of the fluted periphery of the feed-wheel, and, by compelling at the same time (in consequence of the spirality of the flutings) a slight rotation of said wheel, dislodges and loosens the grain, whose bunching would otherwise be liable to interfere with the action of the cut-off. At the same time the feed-wheel is compelled to share the proper rotary movement of the shaft G in consequence of the intermeshing of the scalloped flange h of the cut-off H with the flutings of the feed-wheel.

Each shaft G has a grooved collar, I, that receives a yoke, J, capable of being slid longitudinally of the shaft in guide Y. Each yoke J is connected by rod or link K with a wrist, W, upon a plate, M, on the inner extremity of shaft N of feed-regulating index-finger O, having a pointed upper extremity, o. Projecting from finger O near its upper end is a stud, P, that carries a pinion, Q, which meshes in a segment-rack, X, that is fastened to the rear wall of the hopper. The pinion Q is furnished with a handle or hand-wheel, S. The extremity of the stud P is screw-threaded for a thumb-nut, T, which, being screwed home, retains the regulating-finger, and consequently the cut-offs, to any desired adjustment.

A scale-plate, U, attached to the hopper-wall immediately in rear of the point o of finger O, enables the operator to judge of the size of the opening.

In order to enable the taking up of slack and the exact agreement of action of the two series of cut-offs, one or both rods K are screw-threaded, and, being thrust through an orifice in the yoke-head, is secured to any relative adjustment by means of jam-nuts. (See dotted lines V, Fig. 1.)

The spirality of the feed-wheel flutings insures the desired continuity and uniformity of delivery, while the scalloped flanged gates, embracing and sliding spirally upon their feed-wheels, operate to regulate without interrupting the delivery.

I claim as new and of my invention—

In combination with one or more series of sliding cut-offs, H, of a grain-drill and intermediate mechanism J K L M N, the adjusting-finger and gage O, screw-threaded stud P, pinion Q, rack X, and nut T.

In testimony of which invention we hereunto set our hands.
    JESSE P. OUTCALT.
    LEONARD KISSNER.

Attest:
 GEO. H. KNIGHT,
 THEO. MITHOFF.